United States Patent
Basting et al.

[19]

[11] Patent Number: 6,005,880
[45] Date of Patent: *Dec. 21, 1999

[54] PRECISION VARIABLE DELAY USING SATURABLE INDUCTORS

[75] Inventors: Dirk Basting, Göttingen, Germany; Hubertus Von Bergmann, Irene, South Africa

[73] Assignee: Lambda Physik GmbH, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/822,451

[22] Filed: Mar. 21, 1997

Related U.S. Application Data

[60] Provisional application No. 60/039,735, Feb. 14, 1997.

[51] Int. Cl.$^6$ .................................................. H01S 3/00
[52] U.S. Cl. .................................................. 372/38
[58] Field of Search ..................... 372/38, 82, 86

[56] References Cited

U.S. PATENT DOCUMENTS

| | | |
|---|---|---|
| 4,718,072 | 1/1988 | Marchetti et al. . |
| 4,928,020 | 5/1990 | Birx et al. . |
| 5,142,166 | 8/1992 | Birx . |
| 5,177,754 | 1/1993 | Ball et al. . |
| 5,181,217 | 1/1993 | Sato et al. . |
| 5,305,338 | 4/1994 | Wakata et al. ............ 372/38 |
| 5,313,481 | 5/1994 | Cook et al. . |
| 5,315,611 | 5/1994 | Ball et al. ............ 372/38 |
| 5,319,665 | 6/1994 | Birx . |
| 5,729,562 | 3/1998 | Birx et al. . |
| 5,754,579 | 5/1998 | Mizoguchi et al. ............ 372/58 |
| 5,914,974 | 6/1999 | Partlo et al. ............ 372/58 |

FOREIGN PATENT DOCUMENTS

| | | |
|---|---|---|
| 3842492 | 6/1990 | Germany . |
| PCT/US96/01033 | 1/1996 | WIPO ............ H01S 3/00 |

OTHER PUBLICATIONS

"Thyratrons with Magnetic Switches:The Key to Reliable Excimer Lasers", D. Basting et al., *Laser und Optoelektronik*, Nr. Feb. 1984, pp. 128–131.

"Magnetic Switching Circuits for Variable High Voltage Pulse Delays and Gas–Laser Synchronisation", Baker et al., *J. Phys.E:Sci.Instrum*, 19, 1986, pp. 149–152. No Month.

"Regulation and Drive System for High Rep–Rate Magnetic Pulse Compressors", Birx et al., *Proceedings 15th Power Modulator Symposium*, pp. 15–21. May 1982.

"The Use of Saturable Reactors as Discharge Devices for Pulse Generators", Melville, *The Proceedings of the Institution of Electrical Engineers*, Part III, vol. 98, 1951, pp. 185–207. No Month.

I. Smilanski et al., Electrical excitation of an XeCl laser using magnetic pulse compression, Appl. Phys. Lett. 40(7), 1982 American Institute of Physics, Apr. 1, 1982, pp. 547–548.

O. Kobayashi et al., "High power repetitive excimer lasers pumped by an all solid state magnetic axciter," SPIE vol. 622, High Power and Solid State Lasers, pp. 111–117, 1986.

A. L. Keet et al., "High voltage solid–state pulser for high repetition–rate gas lasers," EPE Aachen, 1989.

(List continued on next page.)

*Primary Examiner*—Rodney Bovernick
*Assistant Examiner*—Robert E. Wise
*Attorney, Agent, or Firm*—Limbach & Limbach L.L.P.

[57] ABSTRACT

An apparatus and method for providing accurate sub-nanosecond timing control between the voltage outputs of branches of an excitation circuit which are driven by a common switch. This invention allows for the introduction of variable timing delays between the branches of the circuit, and eliminates relative timing jitter. Using saturable inductors with variable bias in the high-voltage excitation circuit, this invention provides a continuously tuneable delay on the subnanosecond time scale between two or more excitation circuit branches.

42 Claims, 13 Drawing Sheets

OTHER PUBLICATIONS

H.M. VonBergmann, "Thyristor–driven pulsers for multi-kilowatt average lasers," IEE Proceedings–B, vol. 139, No. 2, pp. 123–130, Mar. 1992.

Questek, "Magnetic pulse compression for excimer lasers," Technical Note No. 2, May 1983.

T. Shimada, et al., "An all solid–state megnetic switching exciter for pumping excimer lasers," Rev. of Sci. Instrum., vol. 56, 1985.

T. Shimada, "Semiconductor switched magnetic modulator for rep–rate lasers," IEEE Pulse Conference, 1985.

H.J. Baker et al., "An efficient laser pulser using ferrite magnetic switches," IOP Publishing, pp. 218–224, 1988.

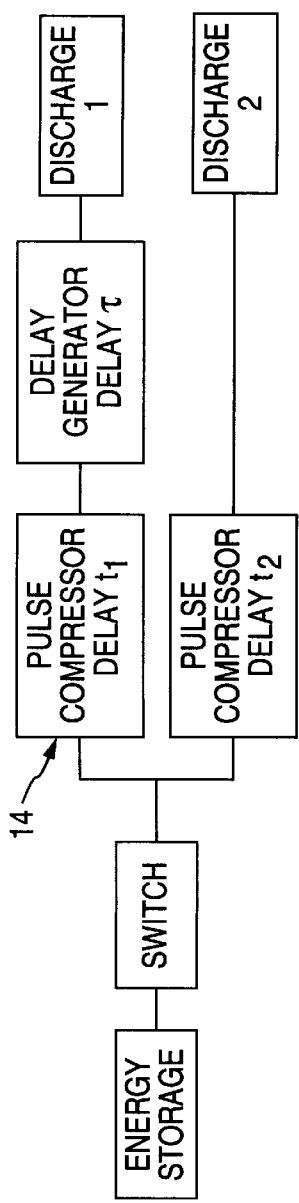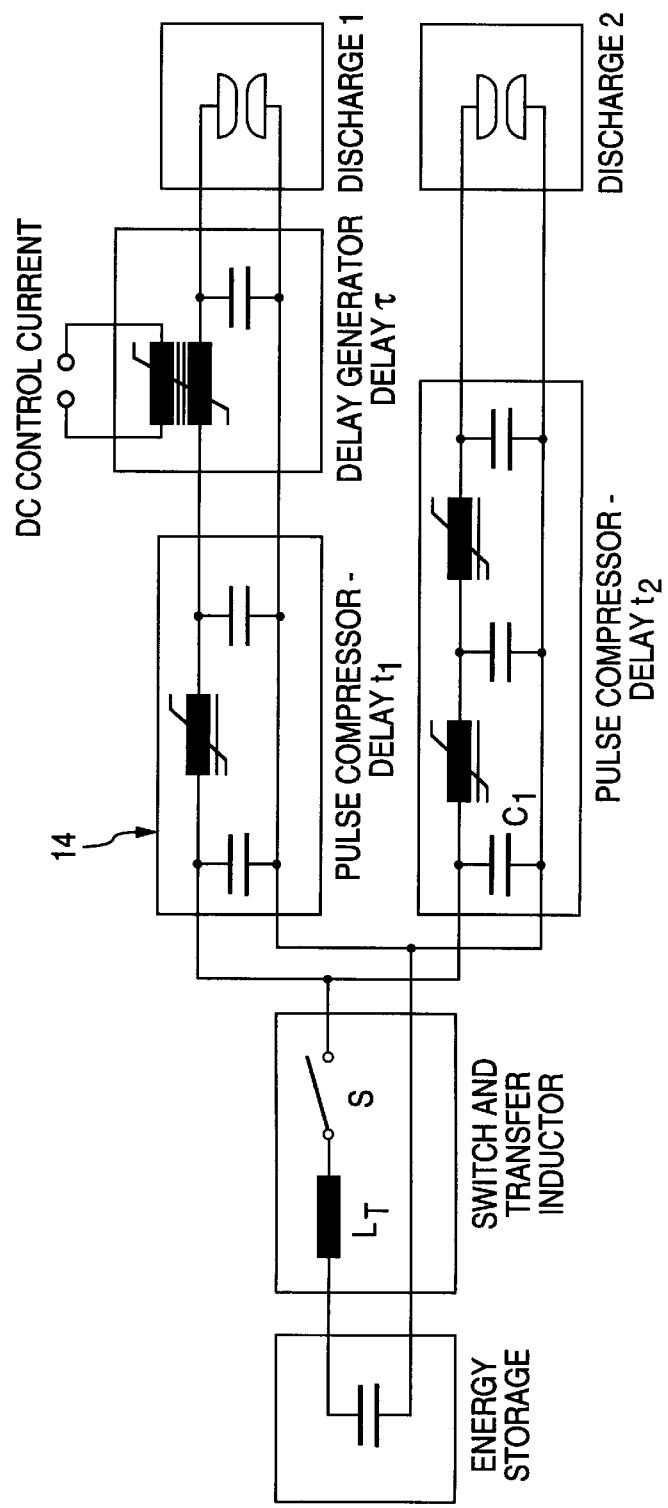
FIG. 16(a)
FIG. 16(b)

PRECISION VARIABLE DELAY USING SATURABLE INDUCTORS

The priority date for this invention is based on the provisional application entitled PRECISION VARIABLE DELAY USING SATURABLE INDUCTORS which was filed on Feb. 14, 1997, and has U.S. application Ser. No. 60/039,735.

BACKGROUND OF THE INVENTION

1. Field of the Invention

This invention relates to a timing control means used in connection with an excitation circuit having multiple branches, which are driven by a common switch, where the branches of the excitation circuit introduce variable timing delays between the voltage output by each of the branches without relative timing jitter.

2. Description of Related Prior Art

Several applications involving pulsed gas laser systems require controlling the timing between two separate discharges used for the excitation of a laser, e.g., preionization and main discharge or spiker and sustainer discharge. This control can also be necessary in systems having two separate lasers, e.g. oscillator and power amplifier or injection locking of large pulsed lasers to low power tuneable and single mode lasers. Commonly these tasks have been accomplished using two separate excitation circuits, driven by individual high voltage switches. The relative timing between these circuits can then be continuously adjusted and delayed by synchronized trigger generators.

While modern digital electronics can provide accurately timed trigger sources with continuously variable delays on the nanosecond and subnanosecond time scale and with sub-nanosecond jitter, high voltage switches employed in pulsing systems for laser discharge excitation are inherently subject to switching time jitter.

Switching time jitter relates to the time interval between the application of a trigger pulse to a high voltage switch, and the actual switching of the high voltage switch. This time interval is called the delay time. This time interval is not absolutely stable. Within the high voltage switch, such as a thyratron or spark gap, a highly conducting plasma must develop. The plasma formation includes avalanche type electron multiplication. This plasma formation depends on the starting conditions and causes variations in the delay time. The statistically varying portion of the delay time is called switching time jitter. For example, the spark gap high voltage switches and thyratons are subject to switching time jitter on the order of 10–100 ns for the former and 1–6 ns for the latter.

In order for a thyratron to be switched with an accuracy approaching one nanosecond, expensive, specifically selected thyratrons or multiple grid tubes have to be employed and trigger circuits have to drive the grids with fast rising, kilovolt trigger pulses. High voltage switching, using solid state switches, yields switching time jitter similar to thyratrons. An additional source for time jitter is the voltage dependent switching delay of excitation circuits, particularly for circuits employing magnetic pulse compression stages. Charging voltage regulation of better than 0.1% is generally required if a time jitter in the nanosecond range is required.

The problem of relative switching time jitter can be eliminated by employing a common high voltage switch for both discharge circuits. While this will eliminate the timing jitter, it will also remove the ability of continuously tuning the relative timing, as can be obtained with separately switched circuits, since only fixed time delays can be designed into the excitation circuits.

Magnetic switches, utilizing saturable inductors, have been employed in laser excitation circuits to provide magnetic pulse compression of the excitation pulses. The time delay jitter introduced by variations of the charging voltage in saturable inductor stages can be controlled on the nanosecond time scale, by either precise regulation of the charging voltage or by accurately measuring the charging voltage on a shot to shot basis and then adjusting the trigger time of the switching element by an external delay generator in order to compensate for voltage fluctuations. For a discussion of this approach to controlling time delay jitter, see, Patent No. DE 3842492 A1, filed Dec. 12, 1988, inventor Dr. Dirk Basting; and D. L. Birx, E. G. Cook, S. Hawkins, A. Meyers, L. L. Reginato, J. A. Schmidt and M. W. Smith, "Regulation and drive system for high rep-rate magnetic pulse compressors" Proceedings 15th Power Modulator Symposium, Baltimore, Md., Jun. 14–16, 1982, pp 15–21.

Variable nanosecond time delay in thyratron and spark gap trigger circuits have been realized in the past by using variable bias inductors in low power switching trigger circuits of high voltage switches. (See, D. L. Birx et al., "Regulation and drive system for high rep-rate magnetic pulse compressors", 15th Power Modulator Symposium, Baltimore, Md., 1982; and H. J. Baker and N. Seddon, "Magnetic switching circuits for variable high voltage pulse delays and gas laser synchronization", Journal of Physics E: Scientific Instruments, Volume 19, 1986, pp 149–152) These references provide for using variable bias inductors to control the trigger timing of separately switched elements and are still subject to the jitter of the high voltage switching elements. Today this technique could be practiced using modern digital circuits.

SUMMARY OF THE INVENTION

This invention provides accurate sub-nanosecond timing control between the voltage outputs of branches of an excitation circuit which are driven by a common switch, allows for the introduction of variable timing delays between the branches of the circuit, and eliminates relative timing jitter. Using saturable inductors with variable bias in the high-voltage excitation circuit, this invention provides a continuously tuneable delay on the subnanosecond time scale between two or more excitation circuit branches.

BRIEF DESCRIPTION OF THE DRAWINGS

FIG. 15(*b*) shows a schematic of an excitation circuit with a branch having a variable delay, in accordance with the invention.

FIG. 16(*a*) shows a functional block diagram of an excitation circuit with a branch having a pulse compressor delay in series with a variable delay, in accordance with the invention.

FIG. 16(*b*) shows a schematic of an excitation circuit with a branch having a pulse compressor delay in series with a variable delay, in accordance with the invention.

FIG. 17(*b*) shows a schematic of an excitation circuit with branches having a common pulse compression stage, in accordance with the invention.

FIG. 18(*b*) shows a schematic of an excitation circuit having a variable delay in multiple branches, in accordance with the invention.

DETAILED DESCRIPTION OF THE INVENTION

Figure 1:
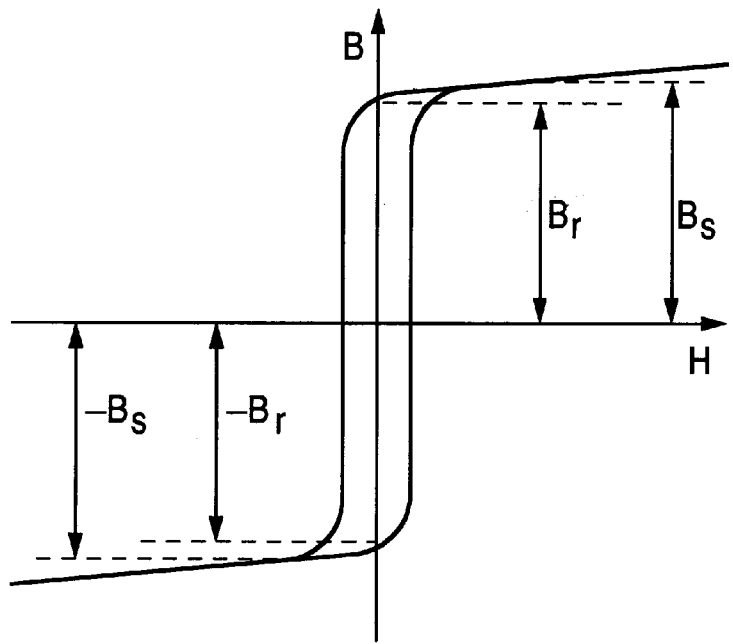
FIG. 1 is a B-H curve of a magnetic core material.

The typical B-H curve of a soft ferromagnetic core is depicted in FIG. 1, showing the positive and negative remanence $B_r$, and saturation $B_s$, flux densities. If a voltage V(t) is applied to an inductor with a magnetic core, a leakage current will flow through the winding, magnetizing the core. If the core was initially reset to $-B_r$, the core state will move up on the B-H curve, through the steep section, where the permeability is very high, until the saturation magnetization $B_s$, is reached and the permeability drops to a low value. This sudden change in permeability from the unsaturated to the saturated state is equivalent, to the switching action of a closing switch and is therefore termed magnetic switching. The time that is needed for the inductor to go into saturation, the saturation time, follows from Faradays Law.

$$\int V\,dt = N A_{eu} \Delta B \qquad (1)$$

where V is the applied voltage, N is the number of turns, $A_{eu}$, the equivalent unsaturated magnetic cross sectional area and $\Delta B$ the available flux swing. For a core reset to $-B_r$, the flux swing is given by $\Delta B = B_r + B_s$. For an applied step voltage pulse the saturation delay or saturation time follows from Equation (1) as $$\tau_{sat} = \frac{N A_{eu} \Delta B}{V} \qquad (2)$$

As can be seen from Equation 2, the delay is determined by the flux swing $\Delta B$, a core parameter, by the inductor design parameters N and $A_{eu}$, as well as the amplitude of the applied voltage pulse. In general the inductor parameters are chosen in accordance with Equation 1 or 2 for a desired fixed saturation delay. A variable time delay can be introduced, if the amplitude of the applied voltage pulse is varied (See, H. J. Baker and N. Seddon, "Magnetic switching circuits for variable high voltage pulse delays and gas laser synchronization", Journal of Physics E: Scientific Instruments, Volume 19, 1986, pp 149–152) or if the flux swing $\Delta B$ is modified.

Figure 2:
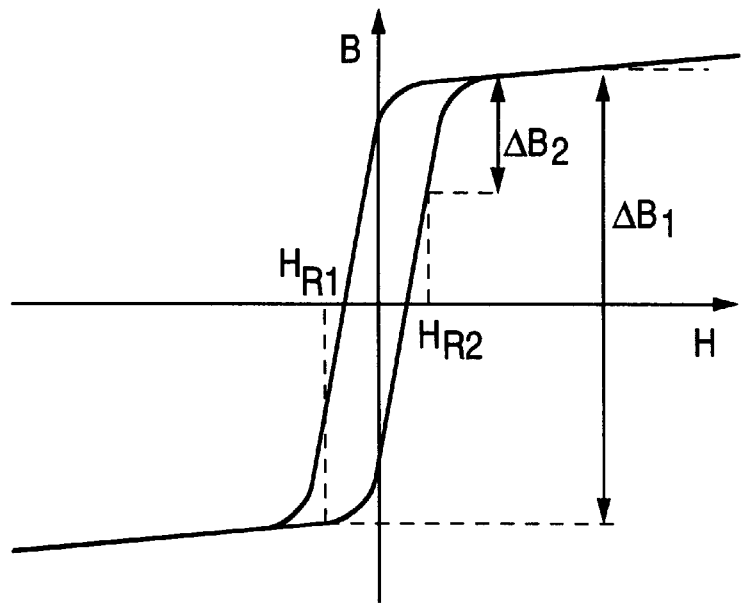
FIG. 2 is a B-H curve where $\Delta B$ is controlled by a dc bias current.

The flux swing $\Delta B$, and with it the time delay, can be controlled by introducing a variable dc bias current to the core. This is illustrated in FIG. 2. If a negative current bias, generating the bias field $H_{R1}$ is applied, the resulting flux swing $\Delta B_1$ is approaching the maximum possible value of $2B_s$. While the positive bias $H_{R2}$ will reduce the available flux swing to a fraction of $B_s$. By applying a dc reset current to the inductor the available flux swing can be continuously varied over the range of 0 to $2 B_s$. This will introduce a variable time delay of 0 to $2 N A_{eu} B_s/V$ in accordance with Equation 2.

If time synchronization of two circuits is required where the two circuits are switched by a common switch and the supply voltage for both circuits is the same, then a variable bias to the magnetic switch can be introduced to adjust the relative timing between both circuits. The time delay, generated by a dc bias current is highly non-linear, as can be seen from FIG. 3(*a*) and 3(*b*), showing the flux swing $\Delta B$ as a function of the dc reset current for two core materials with different B-H behavior.

Figure 3A:
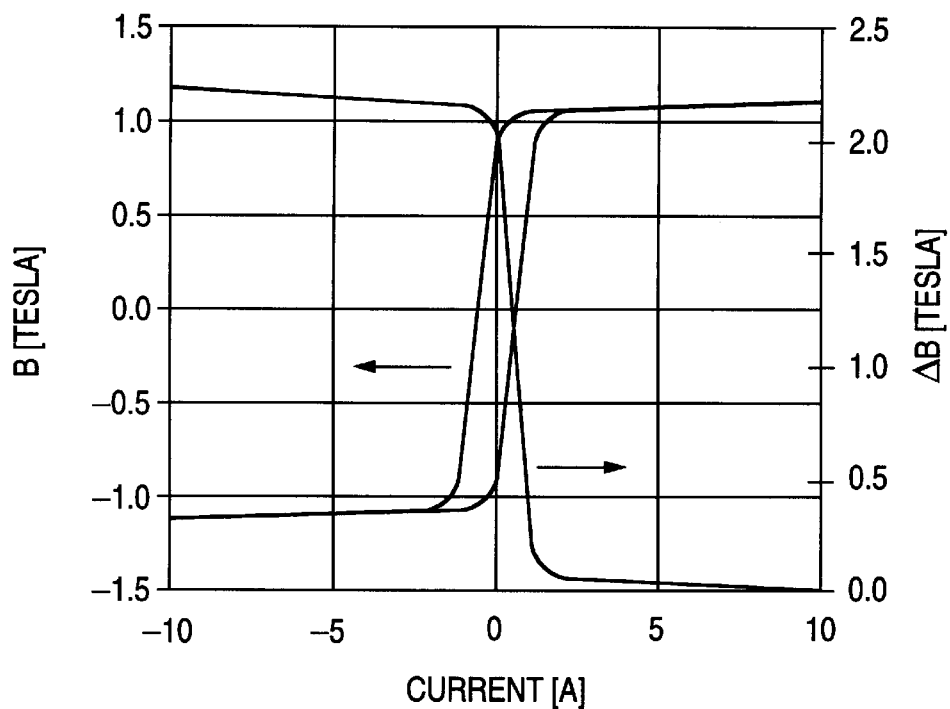
FIG. 3($a$) shows the flux swing $\Delta B$ as a function of dc reset current for one type of magnetic core material, and FIG. 3($b$) shows the flux swing for a different type of magnetic core material.
Figure 3B:
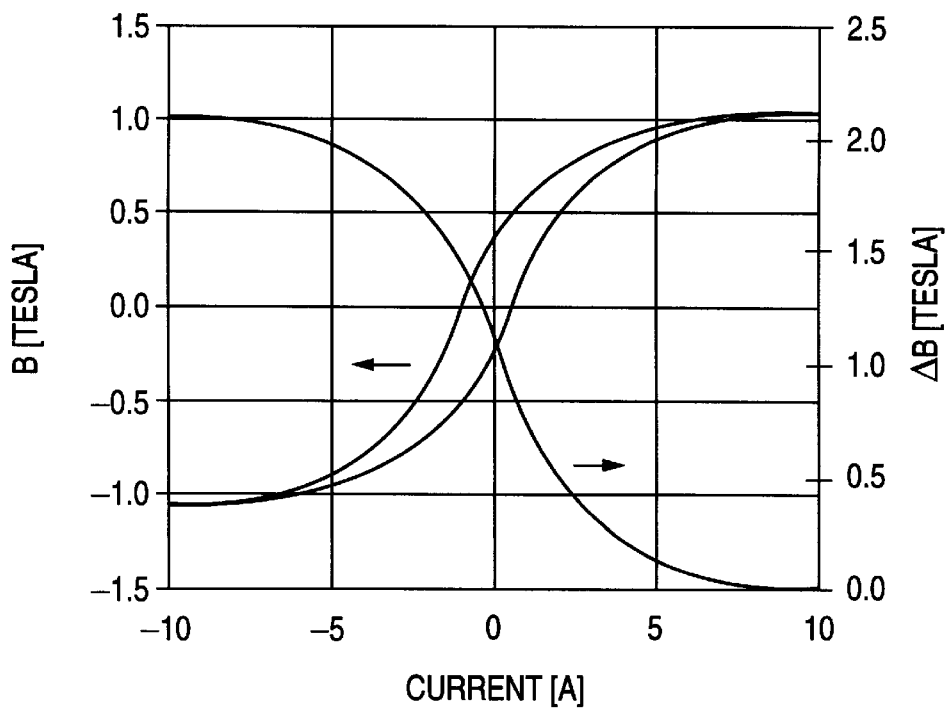

FIG. 3(*a*) shows a typical square loop magnetic core material as e.g. VAC 6030 Z which is often employed in magnetic switching applications because of its excellent switching behavior. For this material the available flux swing and with it the time delay varies very rapidly over a narrow range of dc reset currents. A more gradual control can be obtained from the core material shown in FIG. 3(*b*) with a more sloping B-H characteristic as e.g. VAC 6030 F.

In practice it will be difficult to provide a square voltage pulse as required for equation 2. A practical delay generator circuit will therefore consist of a resonant transfer circuit, which is universally employed in pulse power circuits. The principle of operation of this circuit can be explained by the pair of cascaded resonant transfer loops shown in FIG. 4.

The resonant half-wave transfer times $t_{n-1}$ and $t_n$ are determined by the capacitor values and the saturated inductance in the respective loops.

$$t_n = \pi \sqrt{L_{nsat} \frac{C_n \times C_{n+1}}{C_n + C_{n+1}}} \quad (3)$$

Figure 4:
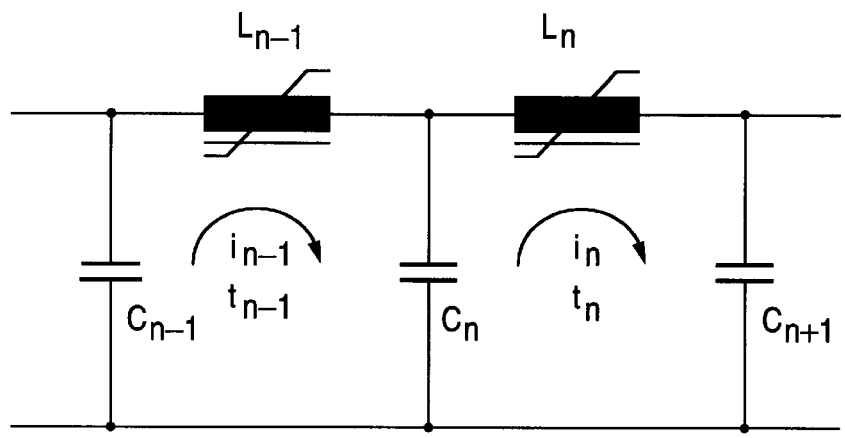
FIG. 4 shows a cascaded resonant transfer circuit of the prior art.

If the inductors in the circuit of FIG. 4 are allowed to saturate the transfer loops can be used for two applications, first for electromagnetic pulse compression (See, W. S. Melville, "The Use of Saturable Reactors as Discharge Devices for Pulse Generation", Proc. IEEE Part III, Radio and Communication Engineering, 98 (1951) 185–207; and D. Basting, K. Hohla, E. Albers and H. M. von Bergmann, "Thyratrons with magnetic switches, the key to reliable excimer lasers", Optoelektronik 16 (1984) 128–136) and second for introducing variable pulse delays. Both applications make use of cascaded resonant transfer circuits, where the transfer is controlled and delayed by saturable inductors. This is illustrated by the voltage diagram of FIG. 5a.

Pulse compression is achieved by reducing the transfer times between successive loops n−1 and n. The hold-off, or saturation delay τ of the two inductors can be calculated from the following equation 4 which is valid for cosinusoidal applied voltage pulses, which are encountered in resonant transfer.

$$\tau_{sat} = \frac{2NA_{eu}\Delta B}{V} \quad (4)$$

Figure 5A:
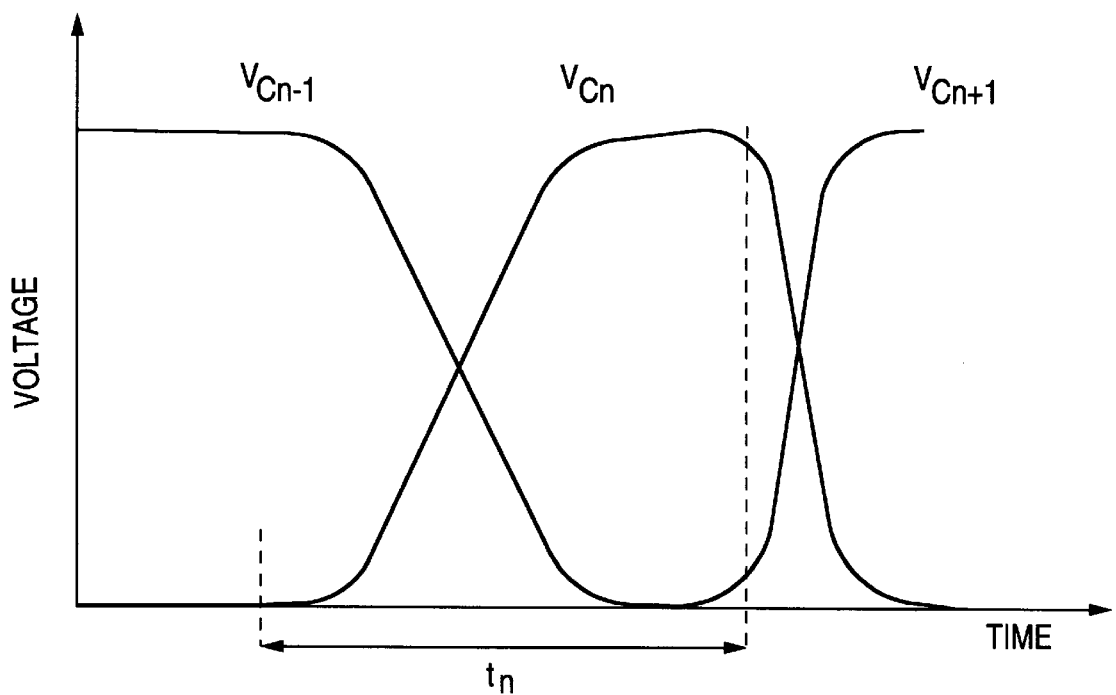
FIGS. 5($a$) and 5($b$) show voltage traces in coupled resonant transfer loops with saturable inductors.
Figure 5B:
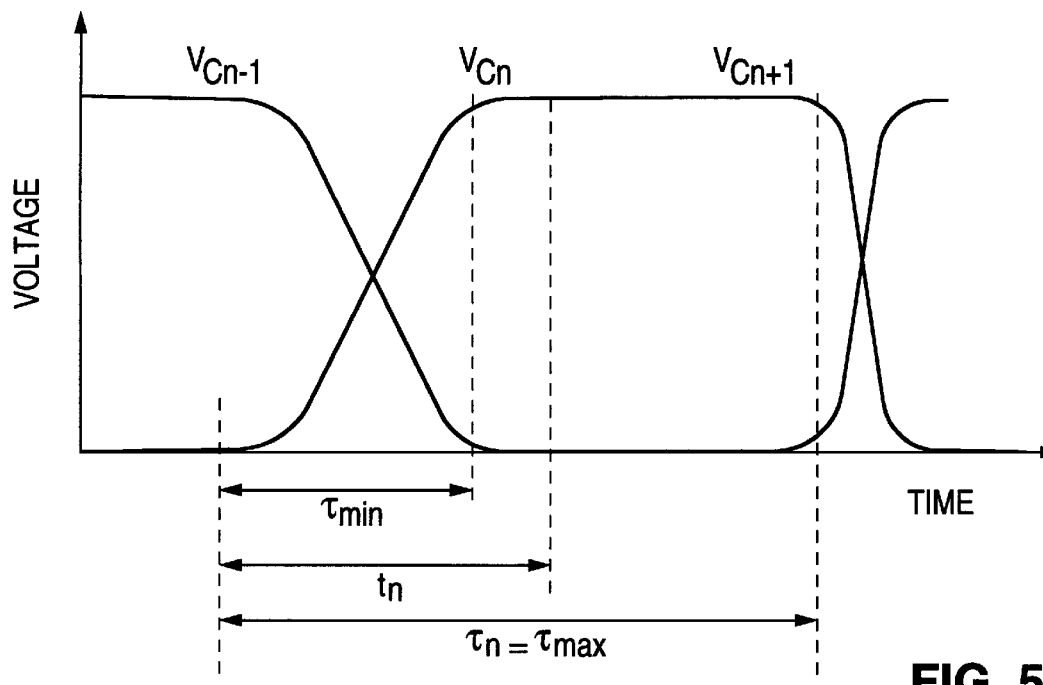

In pulse compressor applications the hold-off time of $L_n$ is adjusted to be $\tau_n \geq t_{n-1}$. The functions, pulse compression and pulse delay can be combined in a single circuit. By over-designing the hold-off of inductor $L_n$ to a value of $\tau_n > t_{n-1}$, a dc bias reset current applied to $L_n$ can be used to vary the delay between the limits of $t_n$ and $\tau_n$. This is illustrated in FIG. 5b, if $L_n$ is allowed to saturate at a somewhat earlier time than $t_n$, when not yet all the energy has been transferred to $C_n$, the transfer efficiency will be reduced. If $L_n$ saturates at the 95% voltage level the minimum allowable delay time $\tau_{min}$ is approximately 0.7 $t_n$.

Figure 6:
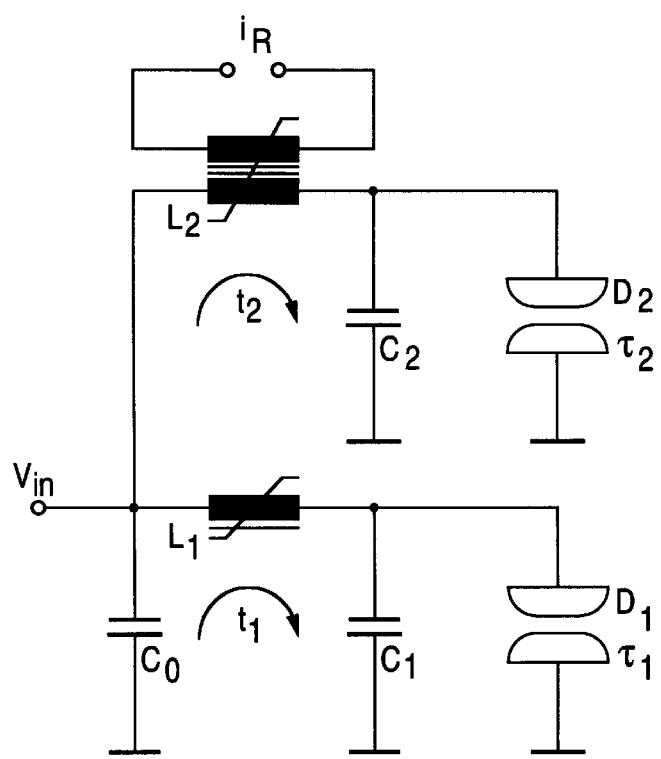
FIG. 6 is a schematic of a single stage double discharge excitation circuit, in accordance with the invention.

A schematic circuit for the excitation of two discharge devices $D_1$ and $D_2$, with individual overall delay times $\tau_1$ and $\tau_2$, from a common input voltage pulse $V_{in}$ is shown in FIG. 6.

The two discharge devices can either be two separate laser systems, e.g., oscillator and power amplifier, or the preionization and main discharges of a single laser. In FIG. 6 the common primary capacitor $C_0$ is charged by the input voltage pulse derived from a single primary switching element either by direct high voltage switching or from a voltage step-up pulse transformer. The same voltage pulse is applied across inductors $L_1$ and $L_2$ with hold-off times $\tau_{11}$ and $\tau_{21}$. The energy is then transferred from $C_0$ to $C_1$ and $C_2$ with the respective resonant transfer times $t_1$ and $t_2$. The overall delay times $\tau_1$ and $\tau_2$ are the sum of the respective hold-off and transfer times. The hold-off of the second circuit can be varied continuously over a limited range, by applying a dc bias reset current to $L_2$. This circuit can be employed under the condition that $t_1 \approx t_2$, i.e. for small relative overall delays, if the delays differ substantially, >10%, the load circuits are not transiently isolated anymore and the circuit with the earlier breakdown will draw the bulk of the energy stored on $C_0$. This is a potentially unstable condition and therefore undesirable. Larger delays can be accommodated if $C_2 \ll C_1$, limiting the maximum energy drawn by circuit 2.

The relative magnitude of inductors and capacitors depends on the amount of energy which must be transferred and on the desired delay range. Typically, the variable delay will be in the range of 0.5 to 50 ns but in special cases the variable delay may be much larger (1 μs or more). Both a higher amount of energy and a larger delay require a long hold-off time. This can be achieved by magnetic cores with large cross section on increased number of cores or a higher number or windings.

Figure 7:
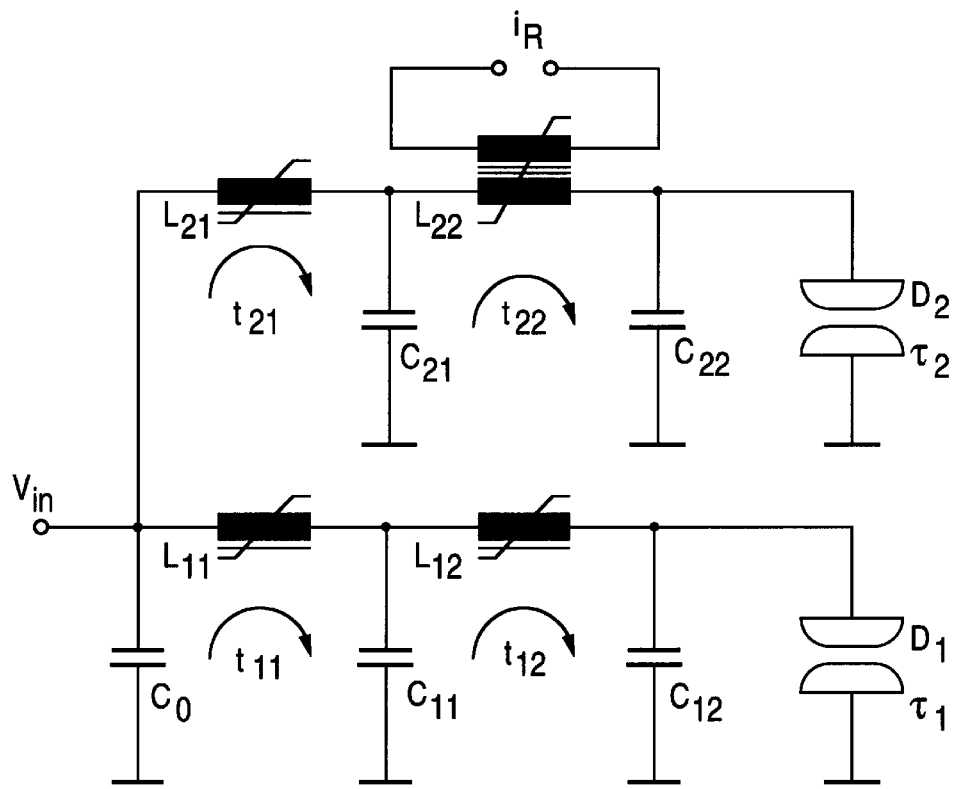
FIG. 7 is a schematic of a double stage, double discharge excitation circuit with transient load isolation, in accordance with the invention.

Transient load isolation of a larger extent can be achieved with the double loop excitation circuit shown in FIG. 7. In this circuit the transfer times $t_{11}$ and $t_{21}$ can be kept close enough to avoid competition between both transfer circuits, while $L_{12}$ and $L_{22}$ act as isolating elements during transfer in the final loops.

Figure 8:
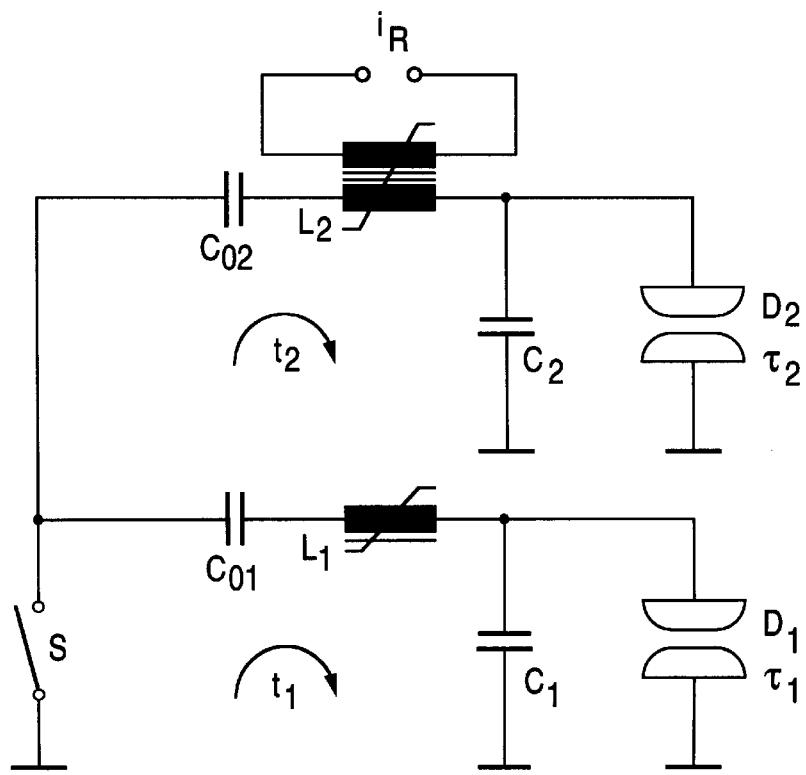
FIG. 8 shows a schematic of a single stage double discharge excitation circuit with transient load isolation, in accordance with the invention.

The circuit in FIG. 8 is designed for complete isolation of the two excitation circuits. Capacitors $C_{01}$ and $C_{02}$ are initially charged to the charging voltage $V_0$ (charging circuit not shown). When the switch S is closed both circuits are uncoupled by connecting $C_{01}$ and $C_{02}$ with their high voltage side to ground. The total delay times $\tau_1$ and $\tau_2$, which are given by Equation 2, can be selected independently without any restrictions. The drawback of this circuit is that the switch S has to be operated at the high voltage required by the discharge devices.

Figure 9:
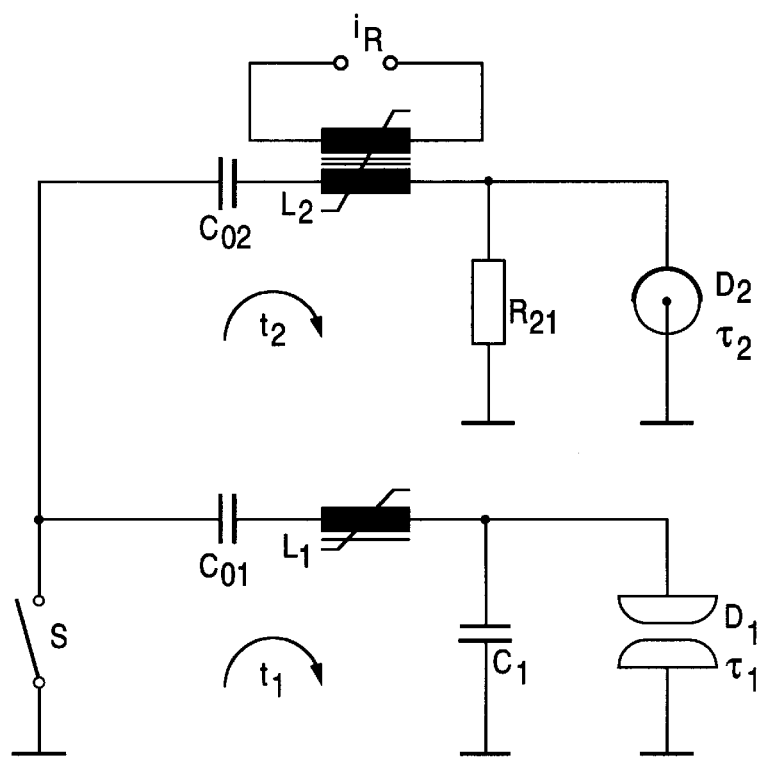
FIG. 9 shows a schematic of a single stage, corona preionization excitation circuit, in accordance with the invention.

A variation of the circuit for the separate, independently timed excitation of a corona preionization circuit $D_2$ is shown in FIG. 9. Because of the small stray capacitance of the corona tube, the required magnetization current for $L_2$ has to be carried by an additional resistor $R_{21}$.

Figure 10A:
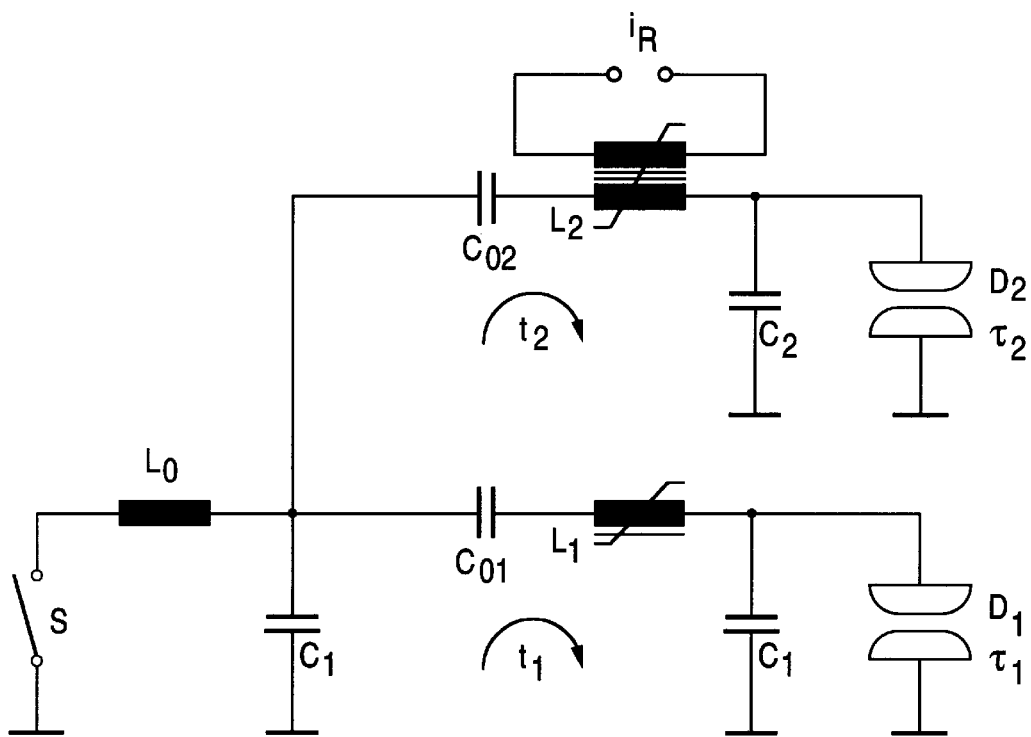
FIGS. 10(*a*) and 10(*b*) show schematics for double L-C inversion voltage doubling circuits for double discharge (a) and corona preionizer (b) excitation, in accordance with the invention.
Figure 10B:
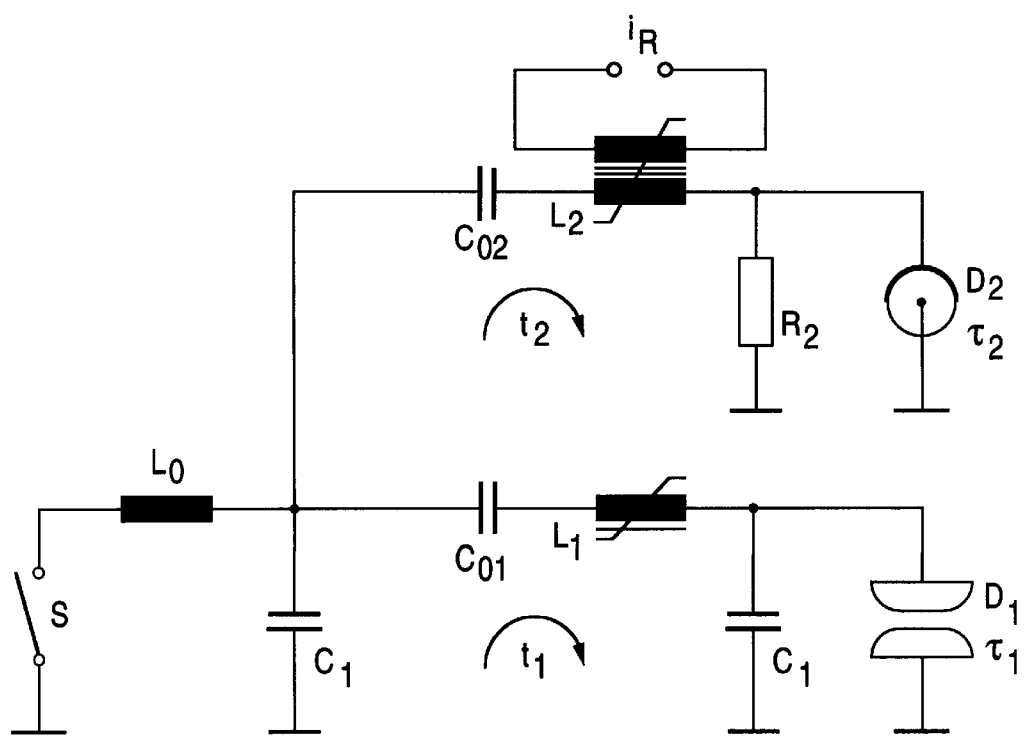

The circuits of FIG. 10(a) and 10(b) are variations of the LC-inverter circuit, which is high-voltage switched, but has the advantage of voltage doubling in the inversion stage, reducing the primary switch voltage. The circuit is shown for the excitation of two discharges, FIG. 10(a), e.g. two main discharges of separate lasers of spark preionization and main discharge of the same laser and for corona preionization excitation FIG. 10(b).

Figure 11:
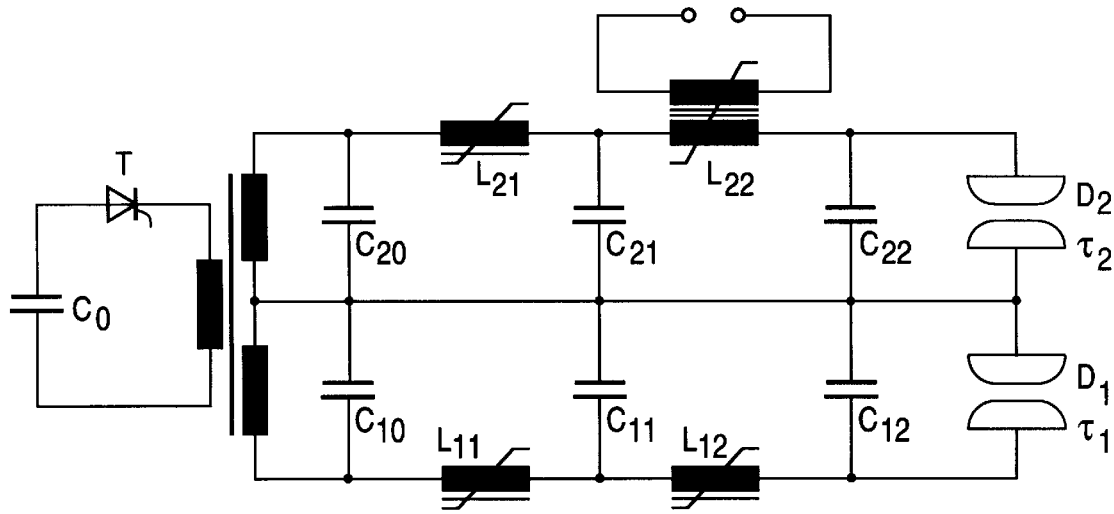
FIG. 11 shows a schematic of a thyristor switched, double stage, double discharge excitation circuit with step-up pulse transformer and independent output voltages, in accordance with the invention.

Semiconductor switching of high voltage excitation circuits can be achieved by switching the primary voltage at a level, compatible with semiconductors, and then stepping up the voltage to the required level by a pulse transformer. The circuit of FIG. 11 employs a pulse transformer with two secondary windings for the independent voltage control of both circuits. Although both output voltages can be set independently, they are inherently synchronized and no charging voltage related time jitter is experienced if $\tau_1 = \tau_2$.

Figure 12:
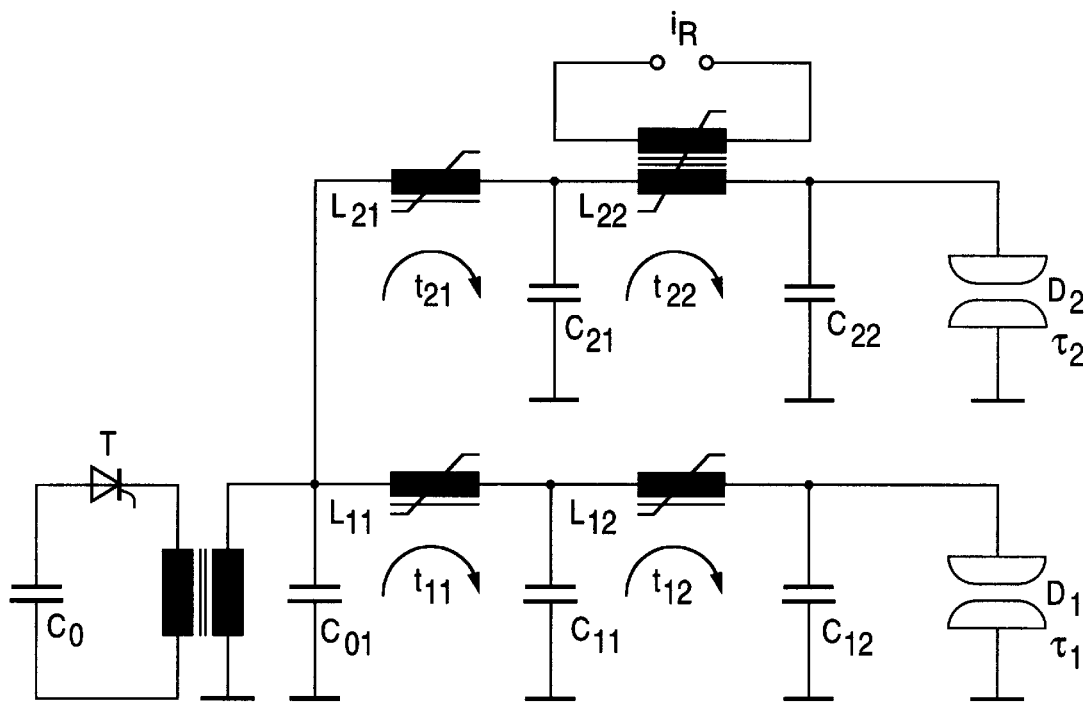
FIG. 12 shows a schematic of a thyristor switched, double stage, double discharge excitation circuit with step-up pulse transformer, in accordance with the invention.

A variation of the circuit with only a single secondary winding on the pulse transformer, generating identical input voltages for both circuits is shown in FIG. 12.

Figure 13:
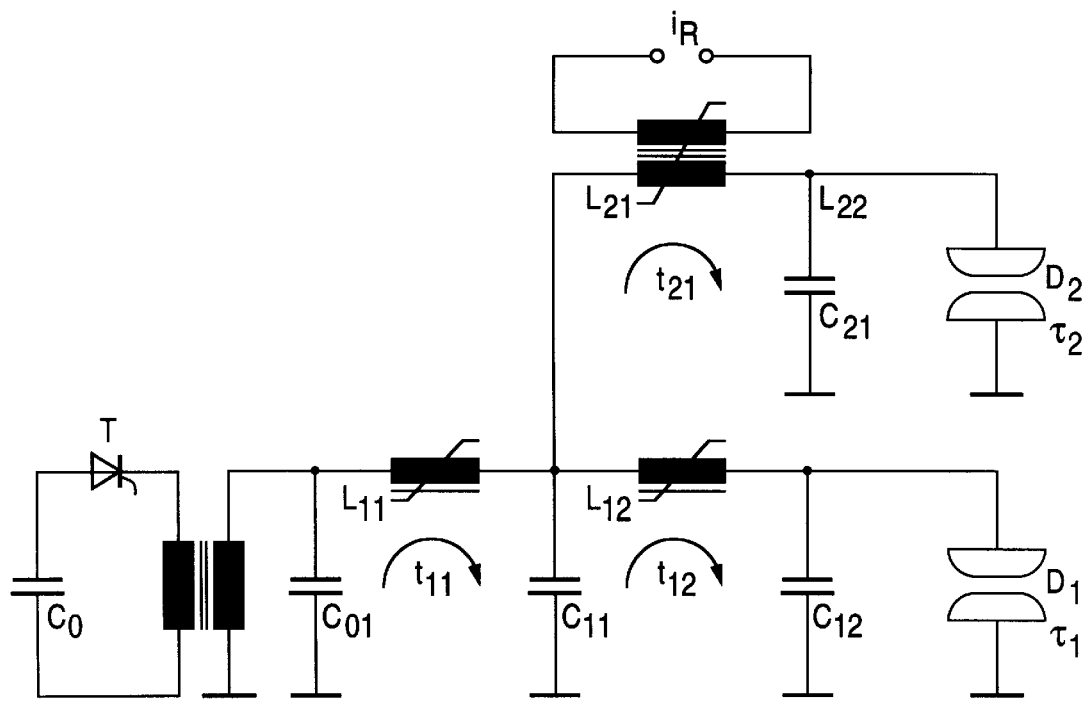
FIG. 13 shows a schematic of a thyristor switched, double discharge excitation circuit with step-up pulse transformer and a common compression stage, in accordance with the invention.
Figure 14:
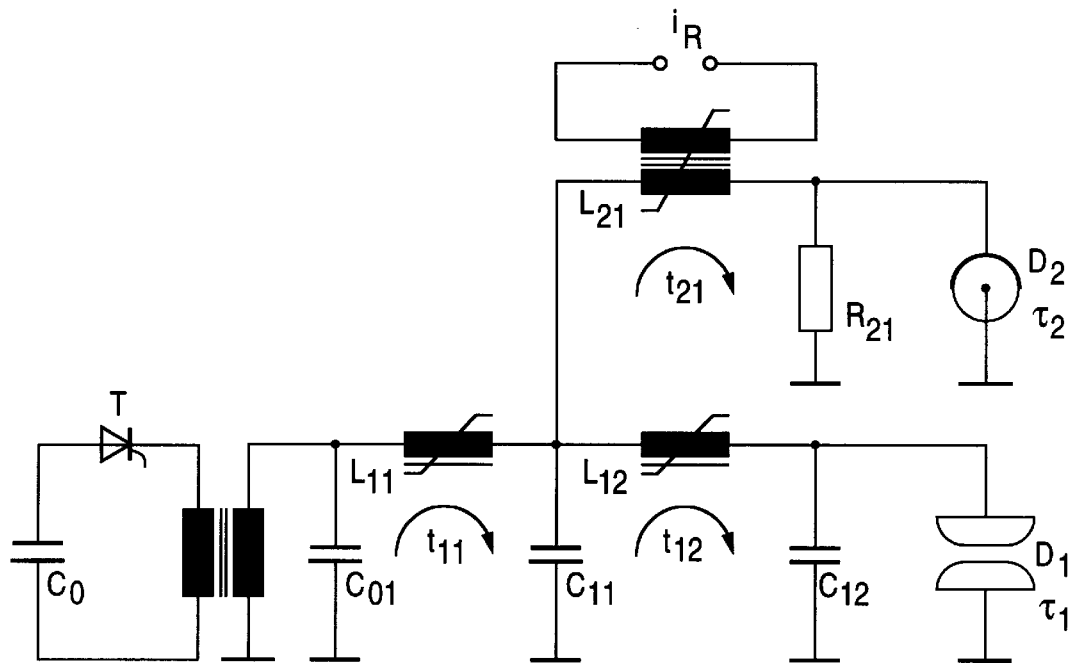
FIG. 14 shows a schematic thyristor switched, corona preionization excitation circuit with step-up pulse transformer and a common compression stage, in accordance with the invention.

The number of circuit components required for the circuits, especially in a multi-stage circuit, can be reduced by using a number of common compression stages for both excitation circuits and only splitting the circuits up before the last stage. This has, however, the disadvantage of reduced transient load isolation. Examples for circuits of this type are shown in FIGS. 13 and 14.

In all example circuits described above, the charging circuits, consisting of charging inductors connected in parallel to the discharge load and other necessary components have been omitted. Additionally, although some of the figures identify the common switch as a thyristor, other solid state switching devices could also be used. For clarity only reset windings with variable bias have been shown in the circuits. In practical circuits, however, all saturable inductors are provided with reset windings and a fixed bias current to initially set the cores to negative saturation. This is necessary to obtain reproducible saturation time delays and to minimize the required volume of magnetic materials.

Although all circuits have been shown for the excitation of only two independent discharge devices, this number is not limited to two and in principle any number of circuits can be switched in parallel, limited only by voltage competition on the primary energy storage capacitor. The maximum number of compression stages has been limited to two in the examples. In practice this number is dictated by the switching capabilities of the primary switching element. For high energies, switched at low primary voltages, this number can be as high as 5. In that case it will be especially economic to use as many stages, common to both circuits, as possible.

IMPLEMENTATION OF INVENTION

Figure 15A:
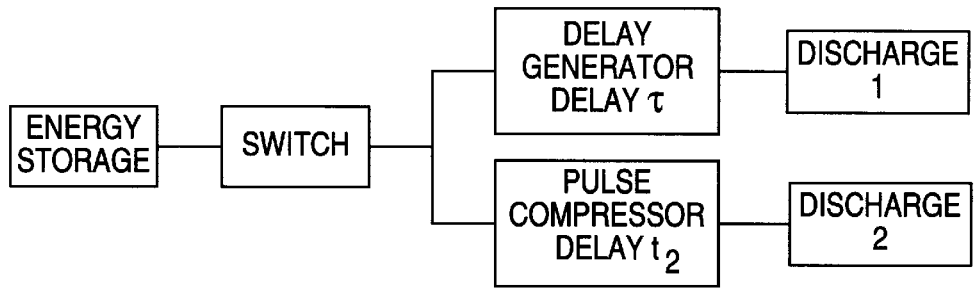
FIG. 15(*a*) shows a functional block diagram of an excitation circuit with a branch having a variable delay, in accordance with the invention.
Figure 15B:
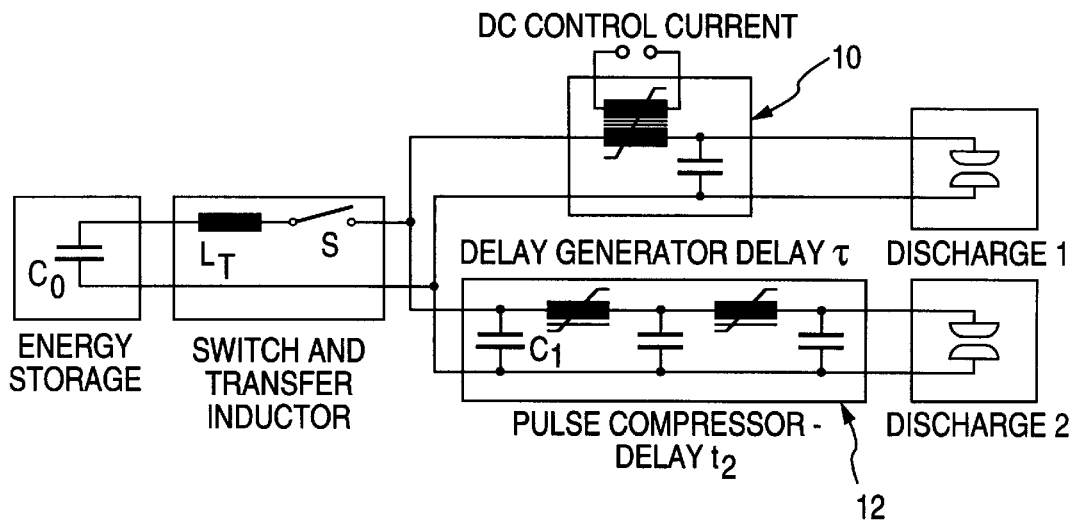

FIG. 15(*a*) shows a functional block diagram of the circuit shown in FIG. 15(*b*). This circuit consists of the primary energy storage capacitor, $C_0$, a transfer switch section which includes a transfer inductor, $L_T$ for resonant charge of the secondary capacitor $C_1$, and the switch, S. Discharge 1 is excited through the dc controlled variable delay generator 10 with delay $\tau_1$, while discharge 2 is excited through a fixed delay pulse compressor 12 with delay $t_2$. The total delay between discharge 1 and 2 is given by:

$$\Delta t = \tau_1 - t_2$$

FIG. 16(*a*) shows a functional block diagram of the circuit of FIG. 16(*b*). This circuit is like that of FIG. 15(*b*) but includes an additional fixed delay pulse compressor 14 for the excitation of discharge 1 with delay $t_1$. The total delay between discharge 1 and 2 is given by:

$$\Delta t = t_1 + \tau_1 - t_2$$

Figure 17A:
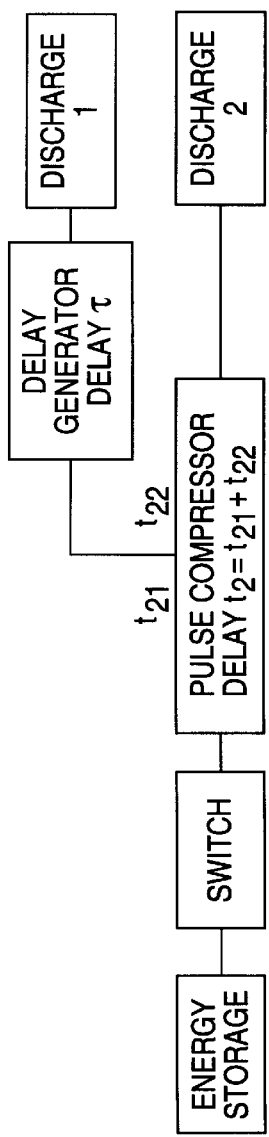
FIG. 17(*a*) shows a functional block diagram of an excitation circuit with branches having a common pulse compression stage, in accordance with the invention.
Figure 17B:
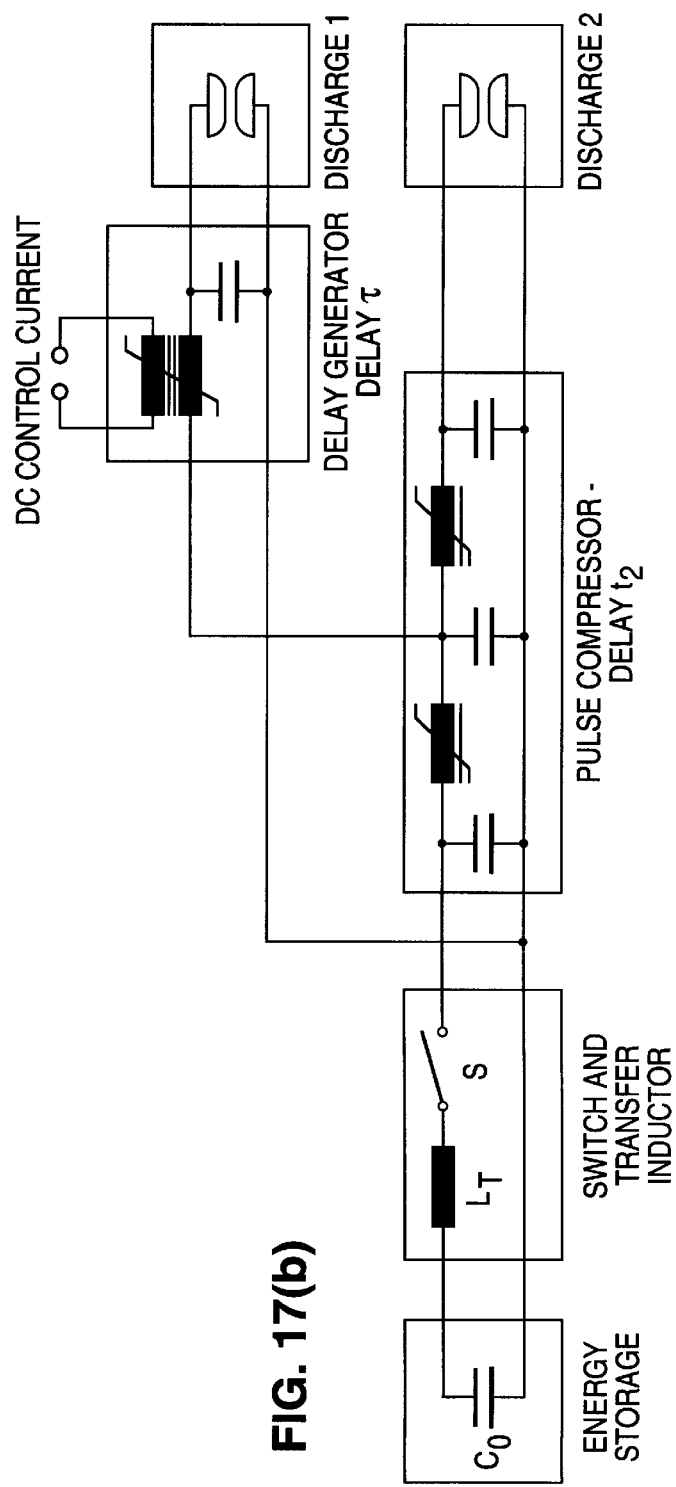

FIG. 17(*a*) is a functional block diagram of the circuit of FIG. 17(*b*). This circuit is also a modification of the one of FIG. 15(*b*). In particular, an additional fixed delay is introduced in the excitation section of discharge 1 by branching off the delay generator circuit at the second stage of the fixed delay pulse compressor of discharge 2. The total delay between discharge 1 and 2 in this circuit is given by:

$$\Delta t = \tau_2 - t_{22}$$

Figure 18A:
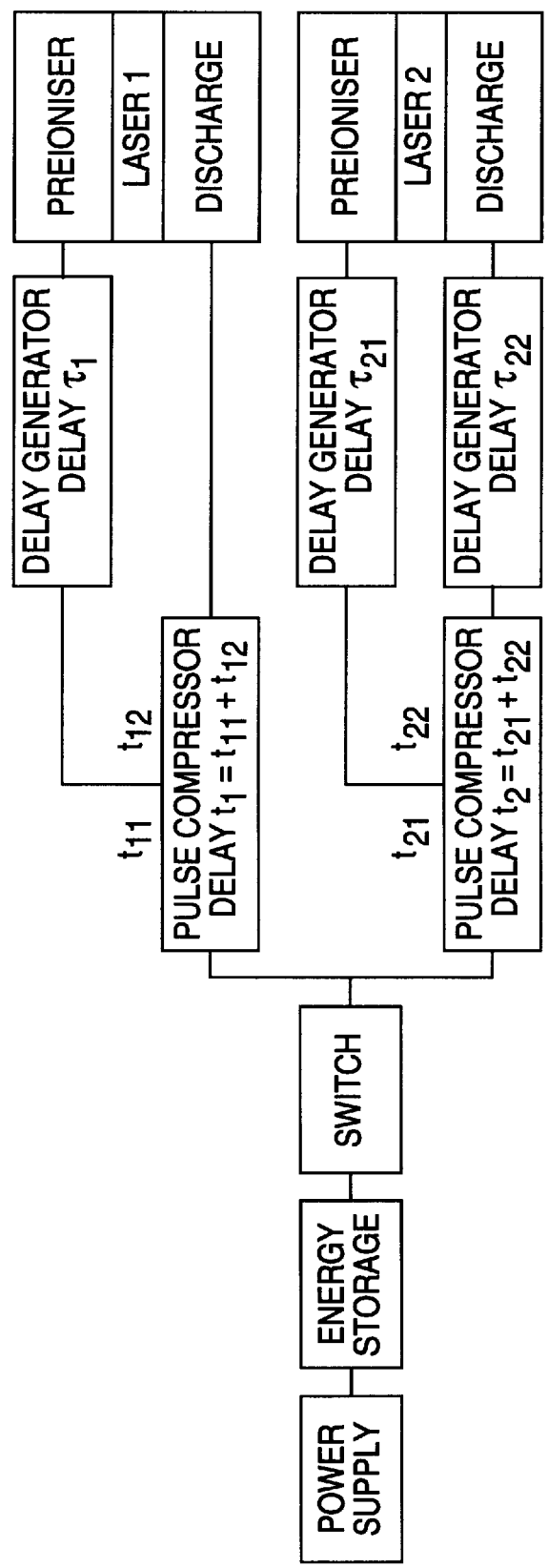
FIG. 18(*a*) shows a functional block diagram of an excitation circuit having a variable delay in multiple branches, in accordance with the invention.
Figure 18B:
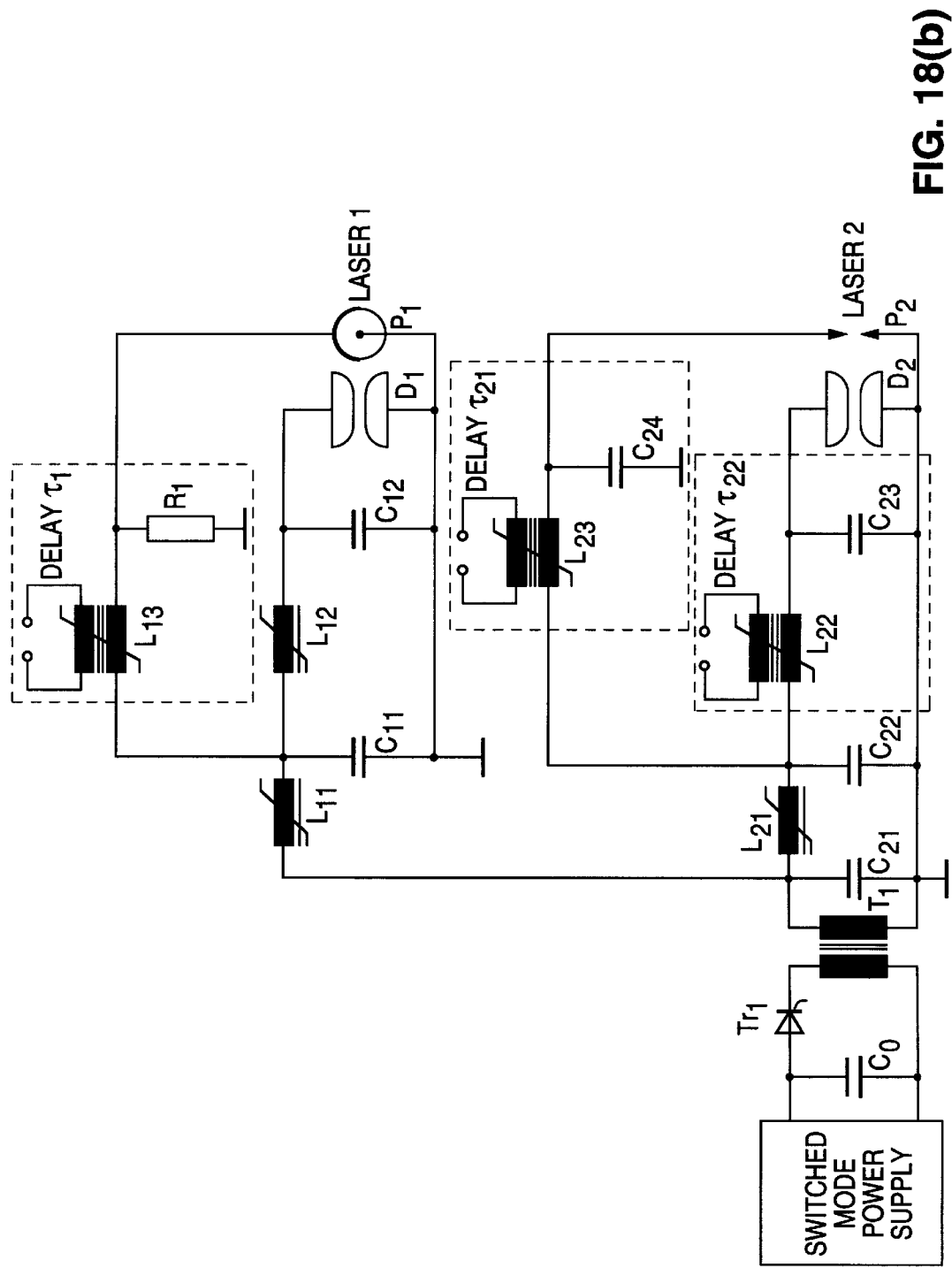

FIG. 18(*a*) is a functional block diagram of a system having variable delay in multiple branches. This system illustrates the principle of precision variable delays by using saturable inductors with an independently timed oscillator amplifier system having precision timed preionization circuits. -Both lasers, the oscillator Laser 1 and amplifier Laser 2, are energized by a common power source consisting of a power supply, a primary energy storage and a transfer switch. Each laser utilizes a double stage pulse compressor for the excitation of their respective main discharges. Variable timing between both discharges is achieved by introducing a variable time delay generator into the excitation circuit of Laser 2. Each laser uses an additional variable delay generator for the precision timing of its respective preionization discharge.

The delays between the main discharges of Laser 1 and Laser 2 is given by:

$$\Delta \tau_{12} = t_1 - t_2 - \tau_{22}$$

The respective delays between the main and preionization discharges of Laser 1 and 2 are given by:

$$\Delta \tau_1 = t_{12} - \tau_1$$

and $$\Delta \tau_2 = t_{22} + \tau_{22} - \tau_{21}$$

A possible implementation of the circuit is shown in FIG. 18(*a*) and FIG. 18(*b*). A switched-mode power supply is used to initially charge the primary energy storage capacitor $C_0$. After the capacitor is fully charged the switch $Tr_1$, preferably a semiconductor switch, such as a thyristor, GTO or IGBT, is switched and transfers the energy through the voltage step-up transformer $T_1$ to the intermediate storage capacitor $C_{21}$, which is common to both lasers. The pulse transformer serves to raise the supply voltage from the relatively low value, required for safe operation of the semiconductor switch (typically 3–5 kV), to the high voltage required for the laser excitation (typically 20–40 kV). The energy transfer is slow, in order to keep the currents within the specifications of the switch (typically 5–20 μs).

Laser 1 employs two pulse compression stages, consisting of the loops $C_{21}$-$L_{11}$-$C_{11}$ and $C_{11}$-$L_{12}$-$C_{12}$ to reduce the pulse duration to the levels needed for excitation of discharge $D_1$ (typically 80–150 ns). A variable delay generator, consisting of $L_{13}$ and $R_1$ allows the accurate adjustment of the relative timing between the corona preionization $P_1$ and the main discharge $D_1$. The time needed for saturation of $L_{13}$ and with it the introduced time delay can be accurately adjusted by a dc bias current applied to an auxiliary winding on $L_{13}$. Typical currents, required are of the order of 1–10 A.

Laser 2 again employs two pulse compression stages, consisting of the loops $C_{21}$-$L_{21}$-$C_{22}$ and $C_{22}$-$L_{22}$-$C_{23}$ to reduce the pulse duration to the levels needed for discharge $D_2$ excitation. The second loop of the pulse compression circuit is simultaneously employed as a delay generator for the adjustment of the relative timing between the two main laser discharges $D_1$ and $D_2$. This timing can be set accurately by applying a suitable dc bias current to inductor $L_{22}$. The spark preionization $P_2$ of Laser 2 is timed relative to $D_2$ by the introduction of a third delay generator, consisting of the transfer loop $C_{22}$-$L_{23}$-$C_{24}$. The timing can be continuously adjusted by applying a dc bias current to inductor $L_{23}$. In the circuits depicted in FIGS. 15 to 18 only reset windings with variable bias have been shown, however, the practical circuits incorporate reset windings on all saturable inductors and a fixed bias current is applied to these inductors to initially set the cores to negative saturation.

As previously explained the delay introduced by a C-L-C resonant transfer loop, which is designed to saturate at the end of transfer, is given by:

$$\tau_{sat} = \frac{2NA_{eu}\Delta B}{V} \quad (5)$$

where N is the number of turns on the inductor, $A_{eu}$ the magnetic core cross section, $\Delta B$ the available flux swing and V the maximum voltage.

If a dc bias current is applied to the core, the available flux swing can be varied from 0 to $\Delta B$ resulting in a theoretical variation of the delay from 0 to $\tau_{sat}$. This is, however, only valid for an applied step voltage pulse. The bias current required for this is given by:

$$i_{dc} = \pm \frac{L_c H_{sat}}{N_r} \quad (6)$$

where $L_c$ is the effective magnetic path length, $H_{sat}$ the saturation field of the magnetic core material and $N_r$ the number of turns of the reset winding. In practice the minimum useful delay $\tau_{min}$ will be limited to approximately 70% of the transfer time of the previous resonant transfer loop (refer to Equation 3 and FIG. 5b). For a core with over designed hold-off, as shown in FIG. 5a, the maximum delay is given by the total hold-off time of the core $\tau_n$. The total hold-off can be calculated from the following equation (refer to FIG. 5b):

$$2\tau_n = \frac{2NA_{eu}\Delta B}{V} + t_n \quad (7)$$

Using the above equations some typical examples can be given.

An inductor fabricated from foil insulated toroidal cores of the amorphous magnetic material VAC 6030 F with the following parameters is used:

| Number of cores: | | 2 |
|---|---|---|
| Core dimensions: | Inner diameter | 50 mm |
| | Outer diameter | 100 mm |
| | Height | 25 mm |
| Number of turns: | Main Winding | 5 |
| | Reset Winding | 5 |

The maximum flux swing $\Delta B$ of the material is 1.6 T, the packing factor 0.65 and the saturation field $H_{sat}$ is approximately 1 A/cm.

For these core parameters the equivalent unsaturated magnetic cross section area $A_{eu}$ can be calculated as 12.5 cm$^2$. The effective flux excursion $\Delta B$ is calculated as the product of the maximum flux excursion and the packing factor, resulting in a value of $\Delta B=1.04$ T. The operating parameters of the inductor are as follows:

Charging voltage V: 30 kV

Voltage rising time $t_n$ 100 ns

The maximum holdoff delay can now be calculated from equation 7 by inserting the number of turns of the main winding N, the magnetic cross section $A_{eu}$ the effective flux swing $\Delta B$, the charging voltage V and the voltage rise time $t_n$. The following maximum delay is derived:

Maximum delay: 267 ns

The minimum delay is given as discussed above, by 70% of the voltage rise time $t_n$ and therefore:

Minimum delay 70 ns

The necessary control bias current follows from equation 6 with the effective magnetic path length calculated from the core dimensions as 23.6 cm, the saturation field of 1 A/cm and the number of reset turns of 5 as:

Control bias current: ±5 A

This means that a bias current swing from approximately −5 A to +2 A will result in a total delay of 70 to 200 ns. The required current range can be modified over a large range by choosing the shape of the BH curve of the employed magnetic material (can be adjusted by the annealing technique used) and the number of reset turns.

If the number of cores is reduced to 1 the following parameters apply:

| Number of turns: | Main Winding | 5 |
|---|---|---|
| | Reset Winding | 5 |
| Operating Voltage | | 30 kV |
| Voltage rise time | | 100 ns |
| Maximum delay | | 158 ns |
| Minimum delay | | 70 ns |
| Control bias current | | ±5 A |

If N27 grade Ferrite is used, which has a maximum flux swing $\Delta B$ of approximately 0.6 T and a saturation $H_{sat}$ field of approximately 1.5 A/cm the following parameters can be derived for a single core and operating conditions:

| Core dimensions: | Inner Diameter | 50 mm |
|---|---|---|
| | Outer Diameter | 75 mm |
| | Height | 12.5 mm |
| Number of turns: | Main Winding | 5 |
| | Resent Winding | 5 |
| Operating Voltage | | 30 kV |
| Voltage rise time | | 50 ns |
| Maximum delay | | 50 ns |
| Minimum delay | | 35 ns |
| Control bias current | | ±6 A. |

Various other modifications and alterations in the structure and use of this invention will be apparent to those skilled in the art without departing from the scope and spirit of the invention. Although the invention has been described in connection with a specific preferred embodiments, it should be understood that the invention as claimed should not be unduly limited to any specific embodiment. It is intended that the following claims define the scope of the present invention and that structures and methods within the scope of these claims and their equivalents be covered thereby.

What is claimed is:

1. An energizing apparatus that supplies electrical energy to a laser system, comprising:

a power supply;

a capacitor capable of storing energy from the power supply;

a transfer circuit having a first branch and a second branch;

a switch operable to cause the transfer of energy from the capacitor to the first branch and the second branch; and wherein the first branch includes a delay stage, said delay stage including a first inductor having a first saturable core, and a first biasing circuit for controllably biasing the first saturable core, wherein biasing the saturable core alters the magnetic flux density of the first saturable core, wherein the first branch is operable to transfer energy from the power supply to a first output at a first time, and the second branch is operable to transfer energy from the power supply to a second output at a second time, and wherein the amount of time between the first time and the second time is a function of the biasing of the first saturable core.

2. The energizing apparatus of claim 1, further including:

a first current source;

wherein the first biasing circuit includes the first current source which supplies current to bias the first inductor by applying a magnetic field to the first saturable core of the first inductor, wherein the magnitude of the magnetic field applied to the first saturable core of the first inductor can be changed by changing the magnitude of the current supplied by the first current source; and wherein the amount of time between the first time and the second time can be varied by varying the current output by the first current source.

3. The energizing apparatus of claim 1, further including:

a second biasing circuit;

wherein the second branch includes a second inductor having a second saturable core; and wherein the second biasing circuit is operable to controllably bias the second saturable core, wherein biasing the second saturable core alters the magnetic flux density of the second saturable core.

4. The energizing apparatus of claim 1, wherein the transfer circuit includes the capacitor, further comprising:

a transformer which steps up a voltage from the power supply which is applied to an input of the transfer circuit.

5. The energizing apparatus of claim 1, wherein the second branch includes multiple loops, wherein each loop has a capacitor which transfers energy to either an intermediate storage capacitor or into a discharge load.

6. The energizing apparatus of claim 1, wherein the first branch includes multiple loops, wherein each loop has a capacitor which transfers energy to either an intermediate storage capacitor or into a discharge load.

7. The energizing apparatus of claim 1, wherein the first branch and the second branch share a common loop in which a capacitor transfers energy to either an intermediate storage capacitor or into a discharge load through an inductor.

8. The energizing apparatus of claim 1, wherein the energy output by the first branch is applied to a preionization excitation circuit of the laser system, and the energy output by the second branch is applied to a main discharge stage of the laser system.

9. The energizing apparatus that supplies electrical energy as in claim 1, wherein the laser system includes an oscillator and a power amplifier, and wherein the energy output by the first branch is applied to the oscillator and the energy output by the second branch is applied to the power amplifier.

10. A system for supplying laser light energy including:

a power supply;

a laser system for outputting laser light energy;

a capacitor capable of storing energy from the power supply;

a transfer circuit having a first branch and a second branch;

a switch operable to cause the transfer of energy from the capacitor to the first branch and the second branch; and wherein the first branch includes a delay stage, said delay stage including a first inductor having a first saturable core, and a first biasing circuit for controllably biasing the first saturable core, wherein biasing the saturable core alters the magnetic flux density of the first saturable core, wherein the first branch is operable to transfer energy from the power supply to the laser system at a first time, and the second branch is operable to transfer energy from the power supply to the laser system at a second time, and wherein the amount of time between the first time and the second time is a function of the biasing of the first saturable core.

11. The energizing apparatus of claim 10, further including:

a first current source;

wherein the first biasing circuit includes the first current source which supplies current to bias the first inductor by applying a magnetic field to the first saturable core of the first inductor, wherein the magnitude of the magnetic field applied to the first saturable core of the first inductor can be changed by changing the magnitude of the current supplied by the first current source; and wherein the amount of time between the first time and the second time can be varied by varying the current output by the first current source.

12. The energizing apparatus of claim 10, further including:

a second biasing circuit;

wherein the second branch includes a second inductor having a second saturable core; and wherein the second biasing circuit is operable to controllably bias the second saturable core, wherein biasing the second saturable core alters the magnetic flux density of the second saturable core.

13. The energizing apparatus of claim 10, wherein the transfer circuit includes the capacitor, further comprising:

a transformer which steps up a voltage from the power supply which is applied to an input of the transfer circuit.

14. The energizing apparatus of claim 10, wherein the second branch includes multiple loops, wherein each loop has a capacitor which transfers energy to either an intermediate storage capacitor or into a discharge load.

15. The energizing apparatus of claim 10, wherein the first branch includes multiple loops, wherein each loop has a capacitor which transfers energy to either an intermediate storage capacitor or into a discharge load.

16. The energizing apparatus of claim 10, wherein the first branch and the second branch share a common loop in which a capacitor transfers energy to either an intermediate storage capacitor or to a discharge load through an inductor.

17. The energizing apparatus of claim 10, wherein the energy output by the first branch is applied to a preionization excitation circuit of the laser system, and the energy output by the second branch is applied to a main discharge stage of the laser system.

18. The energizing apparatus that supplies electrical energy as in claim 10, wherein the laser system includes an oscillator and a power amplifier, and wherein the energy output by the first branch is applied to the oscillator and the energy output by the second branch is applied to the power amplifier.

19. An energizing apparatus that supplies electrical energy from a power supply to a laser system, comprising:

a capacitor capable of storing energy from the power supply;

a transfer circuit having a first branch and a second branch;

a switch operable to cause the transfer of energy from the capacitor to the first branch and the second branch; and wherein the first branch includes a delay stage, said delay stage including a first inductor having a first saturable core, and a first biasing circuit for controllably biasing the first saturable core, wherein biasing the saturable core alters the magnetic flux density of the first saturable core, wherein the first branch is operable to transfer energy from the power supply to a first output at a first time, and the second branch is operable to transfer energy from the power supply to a second output at a second time, and wherein the amount of time between the first time and the second time is a function of the biasing of the first saturable core.

20. The energizing apparatus of claim 19, further including:

a first current source;

wherein the first biasing circuit includes the first current source which supplies current to bias the first inductor by applying a magnetic field to the first saturable core of the first inductor, wherein the magnitude of the magnetic field applied to the first saturable core of the first inductor can be changed by changing the magnitude of the current supplied by the first current source; and wherein the amount of time between the first time and the second time can be varied by varying the current output by the first current source.

21. The energizing apparatus of claim 19, further including:

a second biasing circuit;

wherein the second branch includes a second inductor having a second saturable core; and wherein the second biasing circuit is operable to controllably bias the second saturable core, wherein biasing the second saturable core alters the magnetic flux density of the second saturable core.

22. The energizing apparatus of claim 19, wherein the transfer circuit includes the capacitor, further comprising:

a transformer which steps up a voltage from the power supply which is applied to an input of the transfer circuit.

23. The energizing apparatus of claim 19, wherein the second branch includes multiple loops, wherein each loop has a capacitor which transfers energy to either an intermediate storage capacitor or into a discharge load.

24. The energizing apparatus of claim 19, wherein the first branch includes multiple loops, wherein each loop has a capacitor which transfers energy to either an intermediate storage capacitor or into a discharge load.

25. The energizing apparatus of claim 19, wherein the first branch and the second branch share a common loop in which a capacitor transfers energy to either an intermediate storage capacitor or to a discharge load through an inductor.

26. The energizing apparatus of claim 19, wherein the energy output by the first branch is applied to a preionization excitation circuit of the laser system, and the energy output by the second branch is applied to a main discharge stage of the laser system.

27. The energizing apparatus of claim 19, wherein the laser system includes an oscillator and a power amplifier, and wherein the energy output by the first branch is applied to the oscillator and the energy output by the second branch is applied to the power amplifier.

28. A method for supplying electrical energy to a laser system, comprising the steps of:

supplying electrical energy from a common source to a transfer circuit, which includes a first branch having a delay stage, and a second branch, wherein said delay stage includes an inductor having a first saturable core;

outputting electrical energy from the first branch at a first time;

outputting electrical energy from the second branch at a second time; and biasing the first saturable core, wherein biasing the first saturable core alters the magnetic flux density of the first saturable core, wherein the amount of time between the first time and the second time is a function of the biasing of the first saturable core.

29. The method for supplying electrical energy of claim 28 further including the steps of:

storing electrical energy from a power supply in a capacitor;

transferring electrical energy from the capacitor in response to the closing of a switch;

transferring a first part of the energy transferred from the capacitor through the first branch;

transferring a second part of the energy transferred from the capacitor through the second branch;

biasing the first saturable core by applying a biasing magnetic field to the first saturable core; and outputting a first voltage from the first branch to the laser system at the first time and outputting a second voltage from the second branch to the laser system at the second time.

30. The method for supplying electrical energy of claim 29, further including the steps of:

applying the first voltage to a preionization excitation circuit of the laser system, and the second voltage to a main discharge stage of the laser system.

31. The method for supplying electrical energy of claim 29, wherein the laser system includes an oscillator and a power amplifier, further including the steps of:

applying the first voltage to the oscillator, and applying the second voltage to the power amplifier.

32. The method for supplying electrical energy of claim 28 further including the step of transforming a voltage from the power supply.

33. The method for supplying electrical energy of claim 28, wherein the second branch includes a second inductor having second saturable core, further including the step of:

biasing the second saturable core by applying a biasing magnetic field to the second saturable core.

34. An energizing apparatus that supplies electrical energy from a power supply to a laser system, comprising:

a first capacitor capable of storing electrical energy from the power supply, and a second capacitor capable of storing electrical energy from the power supply;

a transfer circuit having a first branch and a second branch;

a switch operable to cause the transfer energy from the first capacitor to the first branch and from the second capacitor to the second branch; and wherein the first branch includes a delay stage, said delay stage including a first inductor having a first saturable core and a first biasing circuit for controllably biasing the first saturable core, wherein biasing the first saturable core alters the magnetic flux density of the first saturable core, wherein the first branch is operable to transfer energy from the power supply to the laser system at a first time, and the second branch is operable to transfer energy from the power supply to the laser system at a second time, and wherein the amount of time between the first time and the second time is a function of the biasing of the first saturable core.

35. The energizing apparatus of claim 34, further including:

a first current source;

wherein the first biasing circuit includes the first current source which supplies current to bias the first inductor by applying a magnetic field to the first saturable core of the first inductor, wherein the magnitude of the magnetic field applied to the first saturable core of the first inductor can be changed by changing the magnitude of the current supplied by the first current source; and wherein the amount of time between the first time and the second time can be varied by varying the current output by the first current source.

36. The energizing apparatus of claim 34, further including:
  a second biasing circuit;
  wherein the second branch includes a second inductor having a second saturable core; and
  wherein the second biasing circuit is operable to controllably bias the second saturable core, wherein biasing the second saturable core alters the magnetic flux density of the second saturable core.

37. The energizing apparatus of claim 34, wherein the transfer circuit includes the first capacitor and the second capacitor, further comprising:
  a transformer which steps up a voltage from the power supply which is applied to an input of the transfer circuit.

38. The energizing apparatus of claim 34, wherein the second branch includes multiple loops, wherein each loop has a capacitor which transfers energy to either an intermediate storage capacitor or into a discharge load.

39. The energizing apparatus of claim 34, wherein the first branch includes multiple loops, wherein each loop has a capacitor which transfers energy to either an intermediate storage capacitor or into a discharge load.

40. The energizing apparatus of claim 34, wherein the energy output by the first branch is applied to a preionization excitation circuit of the laser system, and the energy output by the second branch is applied to a main discharge stage of the laser system.

41. The energizing apparatus of claim 34, wherein the laser system includes an oscillator and a power amplifier, and wherein the energy output by the first is applied to the oscillator and the energy output by the second branch is applied to the power amplifier.

42. An energizing apparatus that supplies electrical energy to a laser system, comprising:
  a power supply;
  a capacitor capable of storing energy from the power supply;
  a transfer circuit having a first branch and a second branch;
  a switch operable to cause the transfer of energy from the capacitor to the first branch and the second branch; and
  wherein the first branch includes a delay stage, said delay stage including a first inductor having a first saturable core, and a terminal for receiving a biasing current, wherein biasing the saturable core alters the magnetic flux density of the first saturable core, wherein the first branch is operable to transfer energy from the power supply to a first output at a first time, and the second branch is operable to transfer energy from the power supply to a second output at a second time, and wherein the amount of time between the first time and the second time is a function of the biasing of the first saturable core.

* * * * *